(12) United States Patent
Inoue

(10) Patent No.: US 10,191,470 B2
(45) Date of Patent: Jan. 29, 2019

(54) WELDING MACHINE AND CONTROL METHOD THEREFOR

(71) Applicant: AMADA HOLDINGS CO., LTD., Kanagawa (JP)

(72) Inventor: Hiroki Inoue, Kanagawa (JP)

(73) Assignee: AMADA HODLINGS CO., LTD., Kanagawa (JP)

( * ) Notice: Subject to any disclaimer, the term of this patent is extended or adjusted under 35 U.S.C. 154(b) by 180 days.

(21) Appl. No.: 15/126,780

(22) PCT Filed: Jan. 15, 2015

(86) PCT No.: PCT/JP2015/050951
§ 371 (c)(1),
(2) Date: Sep. 16, 2016

(87) PCT Pub. No.: WO2015/170482
PCT Pub. Date: Nov. 12, 2015

(65) Prior Publication Data
US 2017/0123403 A1     May 4, 2017

(30) Foreign Application Priority Data

May 9, 2014 (JP) ................................. 2014-097310

(51) Int. Cl.
*G06F 19/00* (2018.01)
*G05B 19/402* (2006.01)
(Continued)

(52) U.S. Cl.
CPC ............ *G05B 19/402* (2013.01); *B23K 26/02* (2013.01); *B23K 26/032* (2013.01); *B23K 26/04* (2013.01);
(Continued)

(58) Field of Classification Search
CPC ........ G05B 19/402; G05B 2219/45138; G06T 7/13; G06T 7/0004; G06T 2207/30164;
(Continued)

(56) References Cited

U.S. PATENT DOCUMENTS 4,168,430 A * 9/1979 Denis .................... B23K 11/252
219/110
4,380,696 A * 4/1983 Masaki .................. B25J 19/023
219/124.34
(Continued)

FOREIGN PATENT DOCUMENTS

JP    59-178181    10/1984
JP    09-168881    6/1997
(Continued)

OTHER PUBLICATIONS

International Search Report (ISR) issued for International Patent Application No. PCT/JP2015/050951, dated Apr. 21, 2015.
(Continued)

*Primary Examiner* — Adam Lee
(74) *Attorney, Agent, or Firm* — Greenblum & Bernstein, P.L.C.

(57) ABSTRACT

An edge extraction unit extracts an edge image from a photographed image obtained by photographing a product with a camera. A constant edge acquisition unit acquires, as a constant edge image, an edge image in a constant surface where a positional deviation does not occur with respect to a welding point set by a processing program, the acquired image belonging to the extracted edge image. A correction amount acquisition unit performs pattern-matching between a master constant edge image and a workpiece edge image, which are acquired by the constant edge acquisition unit, and acquires a deviation amount between both thereof as a correction amount with respect to the welding point. A processing program correction unit corrects the welding
(Continued)

point by the correction amount, and generates a corrected processing program for welding the workpiece. A welding robot welds the workpiece based on the corrected processing program.

7 Claims, 15 Drawing Sheets

(51) Int. Cl.
| | |
|---|---|
| B23K 26/02 | (2014.01) |
| B23K 26/04 | (2014.01) |
| B23K 26/21 | (2014.01) |
| B23K 26/042 | (2014.01) |
| G06T 7/13 | (2017.01) |
| B23K 26/03 | (2006.01) |
| G06T 7/00 | (2017.01) |
| B25J 9/16 | (2006.01) |
| G05B 19/408 | (2006.01) |

(52) U.S. Cl.
CPC ........... B23K 26/042 (2015.10); B23K 26/21 (2015.10); B25J 9/1684 (2013.01); G05B 19/4083 (2013.01); G06T 7/0004 (2013.01); G06T 7/13 (2017.01); *G05B 2219/37563* (2013.01); *G05B 2219/45104* (2013.01); *G05B 2219/45138* (2013.01); *G05B 2219/4705* (2013.01); *G06T 2207/10004* (2013.01); *G06T 2207/30136* (2013.01); *G06T 2207/30164* (2013.01)

(58) Field of Classification Search
CPC ........... G06T 2207/30136; G06T 2207/10004; B23K 26/21; B23K 26/042; B23K 26/032
See application file for complete search history.

(56) References Cited

U.S. PATENT DOCUMENTS

| | | | | |
|---|---|---|---|---|
| 5,045,668 | A * | 9/1991 | Neiheisel | B23K 26/032 219/121.63 |
| 5,572,102 | A * | 11/1996 | Goodfellow | B25J 9/1697 219/124.1 |
| 6,909,799 | B1 * | 6/2005 | Wildmann | G01B 11/25 382/152 |
| 8,399,281 | B1 | 3/2013 | Patterson et al. | |
| 2002/0088778 | A1 * | 7/2002 | Chang | B23K 26/04 219/121.63 |
| 2003/0204182 | A1 * | 10/2003 | Ahle | A61B 18/20 606/8 |
| 2004/0192155 | A1 * | 9/2004 | Taniguchi | H01T 21/02 445/70 |
| 2007/0047796 | A1 * | 3/2007 | Anantharaman | B23K 31/12 382/141 |
| 2007/0279488 | A1 * | 12/2007 | Lubbers | G01B 5/0014 348/90 |
| 2009/0084764 | A1 * | 4/2009 | Park | B23K 26/032 219/121.63 |
| 2011/0240605 | A1 * | 10/2011 | Takayama | B23K 11/115 219/86.1 |
| 2012/0145771 | A1 * | 6/2012 | Bohlin | B23K 9/0956 228/102 |
| 2013/0105556 | A1 * | 5/2013 | Abell | G05B 23/0221 228/1.1 |
| 2013/0135460 | A1 * | 5/2013 | Syassen | G01L 1/00 348/129 |
| 2014/0309762 | A1 * | 10/2014 | Hayata | B25J 9/1682 700/114 |

FOREIGN PATENT DOCUMENTS

| | | |
|---|---|---|
| JP | 3082829 | 8/2000 |
| JP | 3422687 | 6/2003 |
| JP | 2011-045898 | 3/2011 |
| JP | 2013-035054 | 2/2013 |

OTHER PUBLICATIONS

Extended European Search Report from European Patent Office (EPO) in European Patent Appl. No. 15789826.3, dated Feb. 6, 2018.

* cited by examiner

WELDING MACHINE AND CONTROL METHOD THEREFOR

TECHNICAL FIELD

The present disclosure relates to a welding machine that welds a product as a welding target, and to a control method therefor.

BACKGROUND ART

In the case of welding a plurality of the same products by a welding machine, welding positions of the products are photographed with a camera, and the welding positions are corrected, based on the photographed images (refer to Patent Literature 1).

One of the plurality of products is referred to as a master serving as a reference, and the other products are referred to as workpieces. In Patent Literature 1, in the event of correcting the welding positions, edge images (outline images) of the products are used. By using the edge images, even when the products have stains, scratches, diffusion and the like, pattern-matching between an image of the master and images of the workpieces is performed without being influenced by these stains, scratches, diffusion and the like to a large extent, thus making it possible to correct the welding positions.

CITATION LIST

Patent Literature

[PTL 1] Japanese Unexamined Patent Application Publication No. 2011-45898

SUMMARY OF THE INVENTION

However, each individual of the products has a shape error caused by distortion and the like at the time of bending, or the time of assembly. The pattern-matching using the edge images sometimes cannot accurately correct the welding positions due to such shape errors of the products.

It is an object of embodiments to provide a welding machine capable of welding the individual products, while accurately correcting the welding positions even when the products have shape errors, and to provide a control method therefor.

A first aspect of the embodiments provides a welding machine including: a camera configured to photograph a product as a processing target; an edge extraction unit configured to extract an edge image from a photographed image obtained by photographing the product with the camera; a constant edge acquisition unit configured to, when a surface where a positional deviation does not occur with respect to a welding point on the product, the welding point being set by a processing program for welding the product, is defined as a constant surface, extract, as a constant edge image, an edge image in the constant surface in the edge image which the edge extraction unit extracts from a photographed image obtained in a manner that the camera photographs a region including the welding point; a correction amount acquisition unit configured to, when a product taken as a reference among a plurality of the products is defined as a master, and other products than the master are defined as workpieces, perform pattern-matching between a master constant edge image which the constant edge acquisition unit acquires based on a photographed image of the master and a workpiece constant edge image which the constant edge acquisition unit acquires based on a photographed image of each of the workpieces, and to acquire a first deviation amount between the master constant edge image and the workpiece constant edge image as a correction amount for the welding point; a processing program correction unit configured to correct a welding point, which is set by a processing program for welding the master, by the correction amount acquired by the correction amount acquisition unit, and to generate a corrected processing program for welding the workpiece; and a welding robot configured to weld the workpiece based on the corrected processing program.

Preferably, the above-described welding machine further includes: a constant surface region estimation unit configured to estimate a master constant surface region of the master based on a master edge image, which the edge extraction unit extracts based on the photographed image of the master, and based on first coordinates on the constant surface, and to estimate a workpiece constant surface region of the workpiece based on a workpiece edge image, which the edge extraction unit extracts based on the photographed image of the workpiece and based on second coordinates on the constant surface, wherein the constant edge acquisition unit is configured to acquire an edge image in the master constant surface region as the master constant edge image, and to acquire an edge image in the workpiece constant surface region as the workpiece constant edge image.

Preferably, the above-described welding machine further includes: an operation unit by which an operator indicates the first coordinates on the photographed image of the master.

Preferably, the above-described welding machine further includes: a positional alignment unit configured to align the master edge image and the workpiece edge image with each other, and to acquire a second deviation amount between the master edge image and the workpiece edge image; and a workpiece constant surface coordinate acquisition unit configured to acquire the second coordinates by shifting the first coordinates by the second deviation amount.

A second aspect of the embodiments provides a control method for a welding machine, the control method including: defining a product as a master, which is taken as a reference among a plurality of products, and defining other products than the master as workpieces; acquiring a master image by photographing, with a camera, a region including a welding point on the master, the welding point being set by a processing program for welding the product; extracting a master edge image from the master image; when a surface where a positional deviation does not occur with respect to the welding point is defined as a constant surface of the master, acquiring, as a master constant edge image, an edge image on the constant surface of the master in the master edge image; acquiring a workpiece image by photographing, with the camera, a region including a welding point on each of the workpieces, the welding point being set by the processing program; extracting a workpiece edge image from the workpiece image; acquiring, as a workpiece constant edge image, an edge image on a constant surface of the workpiece in the workpiece edge image; performing pattern-matching between the master constant edge image and the workpiece constant edge image, and acquiring a first deviation amount between the master constant edge image and the workpiece constant edge image as a correction amount for the welding point; correcting a welding point, which is set by a processing program for welding the master, by the correction amount, and generating a corrected processing program for welding the workpiece; and controlling a welding robot to weld the workpiece based on the corrected processing program.

In the above-described control method for a welding machine, preferably, further including: estimating a master constant surface region of the master based on the master edge image and first coordinates on the constant surface of the master; estimating a workpiece constant surface region of the workpiece based on the workpiece edge image and second coordinates on the constant surface of the workpiece; acquiring an edge image in the master constant surface region as the master constant edge image; and acquiring an edge image in the workpiece constant surface region as the workpiece constant edge image.

In the above-described control method for a welding machine, preferably, a position on the constant surface of the master, the position being indicated by an operator, is defined as the first coordinates.

In the above-described control method for a welding machine, preferably, further including: aligning the master edge image and the workpiece edge image with each other to acquire a second deviation amount between the master edge image and the workpiece edge image; and defining a position obtained by shifting the first coordinates by the second deviation amount as the second coordinates.

In accordance with the welding machine and the control method therefor according to the embodiments, even when the products have shape errors, the individual products can be welded while accurately correcting the welding positions.

MODES FOR CARRYING OUT THE INVENTION

A description is made below of a welding machine according to the embodiment and a control method therefor with reference to the accompanying drawings. The welding machine according to the embodiment is, as an example, a laser welding machine that welds a product by a laser beam. The welding machine is not limited to the laser welding machine.

Figure 1:
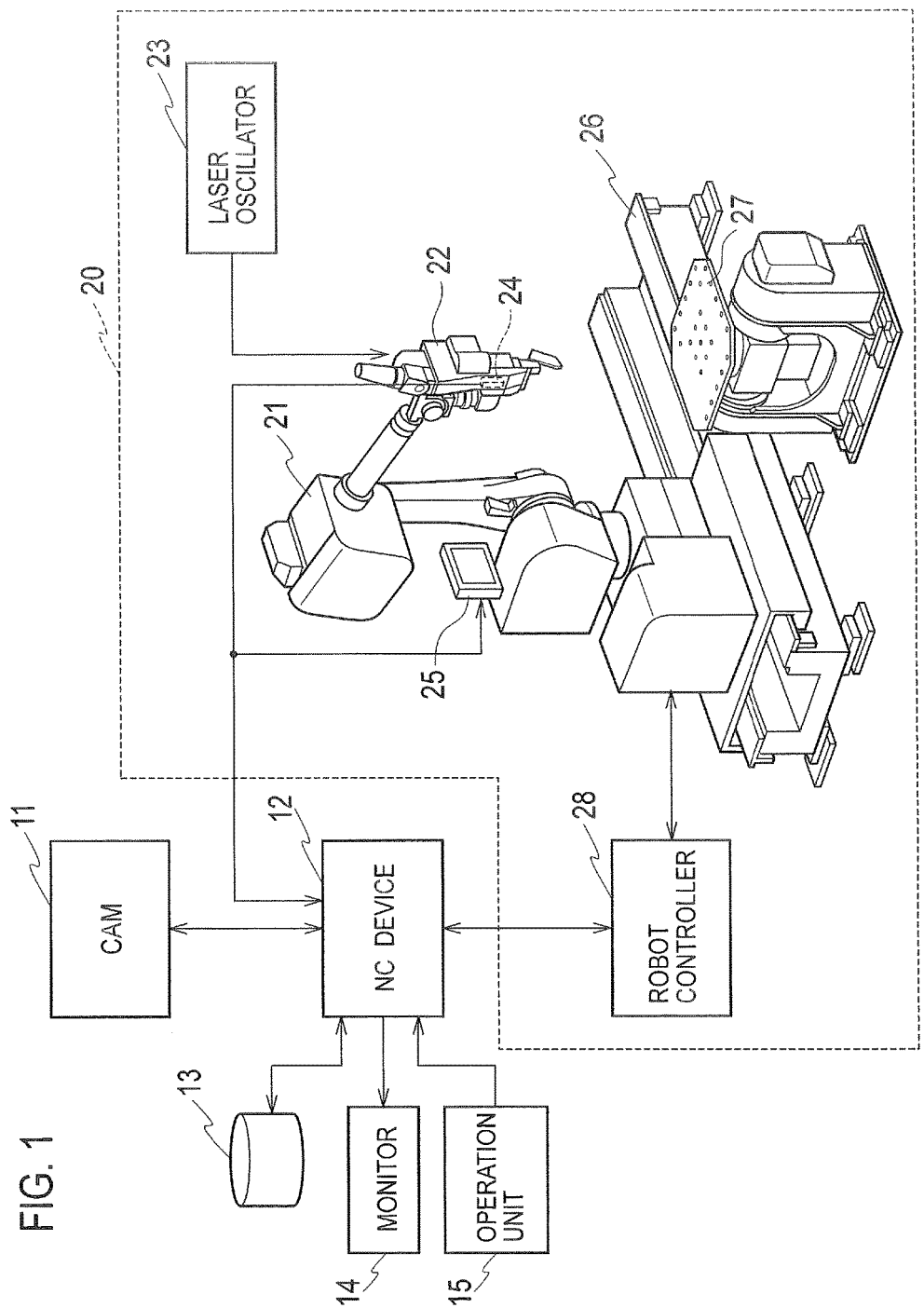
FIG. 1 is a view illustrating an entire configuration example of a laser welding machine that is a welding machine according to an embodiment.

First, by using FIG. 1, a description is made of an entire configuration example of the laser welding machine. In FIG. 1, the CAM 11, the storage unit 13, the monitor 14, the operation unit 15, and the welding robot 20 are connected to the NC device 12.

The operation unit 15 may be a touch panel provided on the screen of the monitor 14. The operation unit 15 may be, for example, an operation unit, which is separate from the monitor 14 and includes a keyboard and a mouse.

The CAM 11 generates a processing program for use in the event of welding the product as a welding target by the welding robot 20. It is also possible to generate the processing program manually (that is, by teaching). The NC device 12 stores the processing program in the storage unit 13.

The processing program is NC data (machine control code) that allows execution of one or plural processing commands to weld the product from a certain welding point to another welding point.

As will be described later in detail, the NC device 12 corrects the processing program as needed. The NC device 12 stores the corrected processing program in the storage unit 13.

The NC device 12 transfers the processing program, which is stored in the storage unit 13, to a robot controller 28 that controls the welding robot 20. In the case where the NC device 12 corrects the processing program, the NC device 12 transfers the corrected processing program to the robot controller 28.

Based on the processing program or the corrected processing program, the robot controller 28 controls the welding robot 20 to weld the product by the laser beam.

The welding robot 20 includes an articulated robot body 21. The welding head 22 is attached onto the tip end portion of the robot body 21. A laser oscillator 23 is connected to the welding head 22, and the laser oscillator 23 supplies the laser beam to the welding head 22.

The welding head 22 has a built-in camera 24. The camera 24 is directed in the same direction as the direction in which the welding head 22 emits the laser beam. The camera 24 may be attached to the outside of the welding head 22. It is preferable that the camera 24 is attached to the inside of the welding head 22.

The robot body 21 is configured to move on the rail 26 by the control of the robot controller 28. In the vicinity of the side surface of the rail 26, the surface plate 27, on which the product as the welding target is disposed, is installed. In some cases, on the surface plate 27, a jig (not shown) for positioning the product is disposed. A welding robot 20 without the rail 26 is also present. In this case, the position of the robot body 21 is fixed.

When the welding head 22 is directed downwards, the camera 24 photographs the surface plate 27 or the product disposed on the surface plate 27. An image photographed with the camera 24 is supplied to and is displayed on the monitor 25, attached to the robot body 21. Moreover, the image photographed with the camera 24 is supplied to the NC device 12, and is displayed also on the monitor 14. Note that, on the monitor 25 and the monitor 14, the photographed image is displayed as a moving picture (real-time image).

Figure 2:
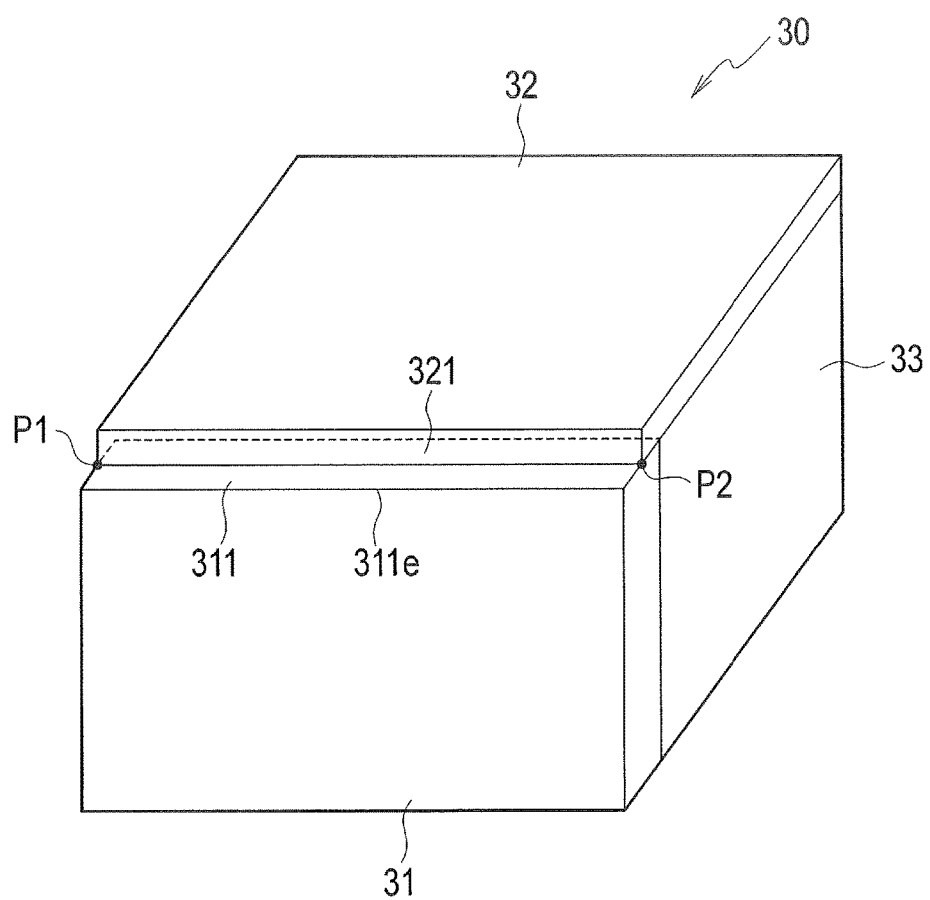
FIG. 2 is a perspective view illustrating an example of a product as a welding target.

FIG. 2 shows an example of the product as the welding target. The product 30 is formed by combining metal plates 31 to 33 with each other. As shown in FIG. 2, the plate 32 is placed on the upper end surface 311 of the plate 31, in a state where the side end surface 321 thereof is apart from the end portion 311e, that is, a so-called semi-hanging state.

For example, in the event of welding the plate 31 and the plate 32 to each other, a boundary between the upper end surface 311 and the side end surface 321 needs to be welded in a range from the welding point P1 to the welding point P2. The processing program includes a processing command to weld the range from the welding point P1 to the welding point P2. The processing program includes a processing command to weld a range between other welding points, which are not shown in FIG. 2. In FIG. 2, the welding points P1 and P2 are shown by the black dots P1 and P2 for the sake of convenience.

Note that in accordance with the orientation of the welding head 22 in the laser welding machine shown in FIG. 1, the welding point P2 becomes the welding starting point, and the welding point P1 becomes the welding ending point.

Figure 3A:
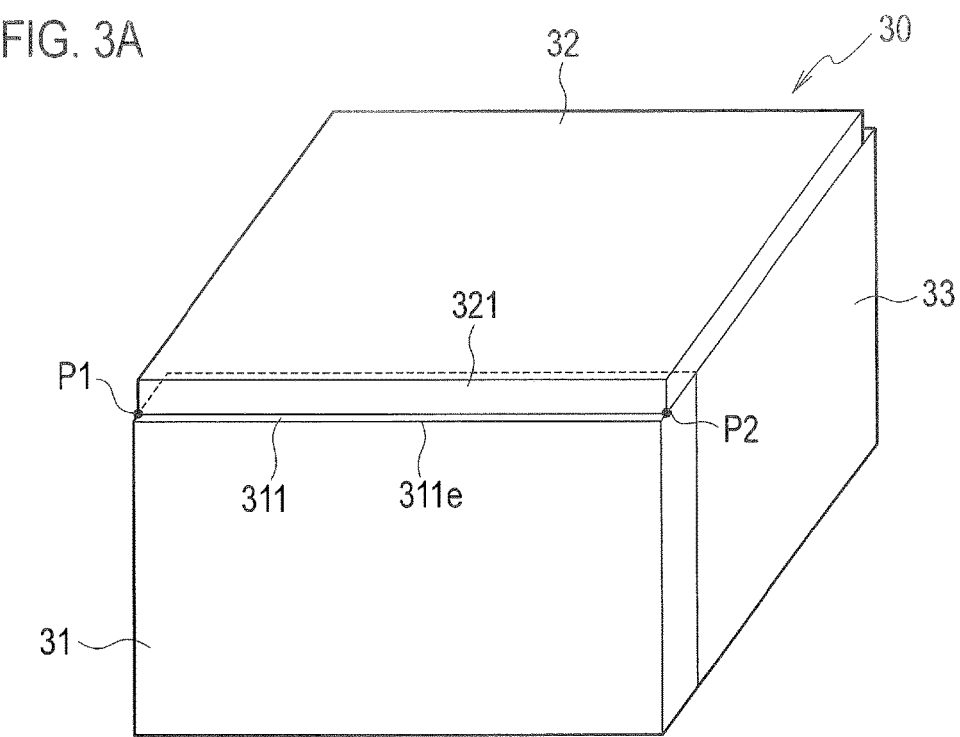
FIG. 3A is a perspective view illustrating a first example of a shape error in the product shown in FIG. 2.
Figure 3B:
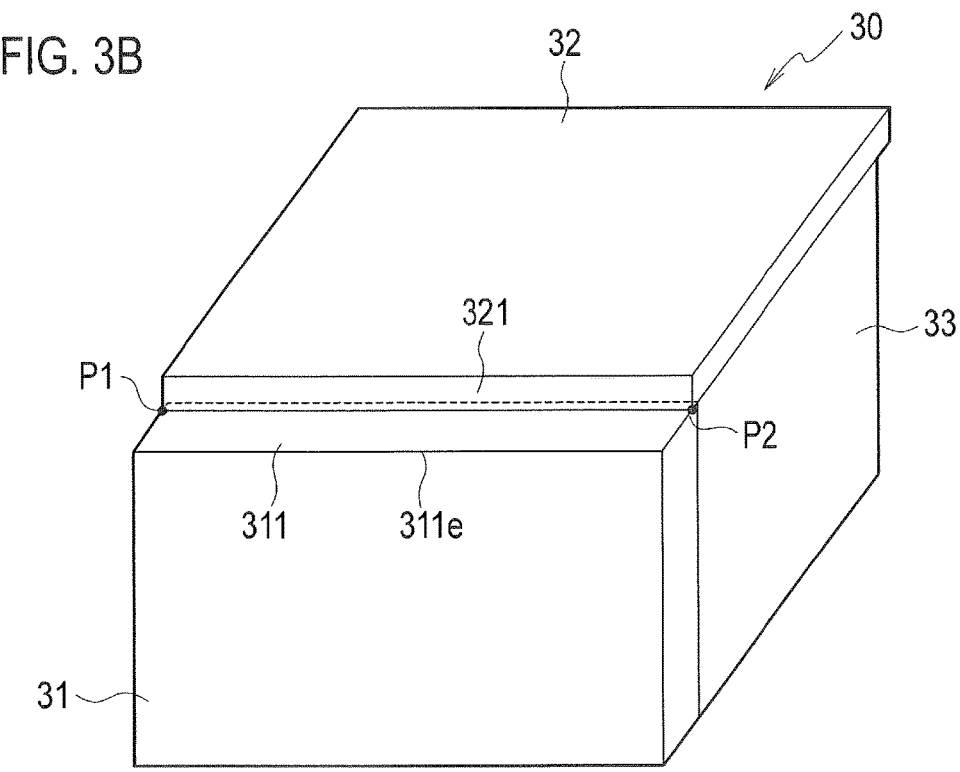
FIG. 3B is a perspective view illustrating a second example of the shape error in the product shown in FIG. 2.

FIG. 3A shows the product 30 in the state where the plate 31 and the plate 32 are assembled to each other in the state where the side end surface 321 gets relatively close to the end portion 311e. FIG. 3B shows the product 30 in a state where the plate 31 and the plate 32 are assembled to each other, a state where the side end surface 321 relatively separates from the end portion 311e.

As shown in FIG. 3A and FIG. 3B, the product 30 (shown in FIG. 2) has a shape error due to a distortion at the time of assembly in some cases. The product as the welding target also has a shape error in some cases, due to other factors such as distortion at the time of bending and the like.

Accordingly, according to the embodiment, in the event of welding a plurality of the same products, the first product taken as a master that serves as a reference and the NC device 12 acquires master information, which will be described later, based on such a master product. According to the embodiment, the NC device 12 corrects a processing program, which is for use in the event of processing workpieces as a second product and after, based on the master information.

In the event of welding the plurality of products 30 shown in FIG. 2, it is recommended to select such a product 30, in which an assembly error of the plates 31 to 33 is the smallest, as the master among the plurality of products 30.

Figure 4:
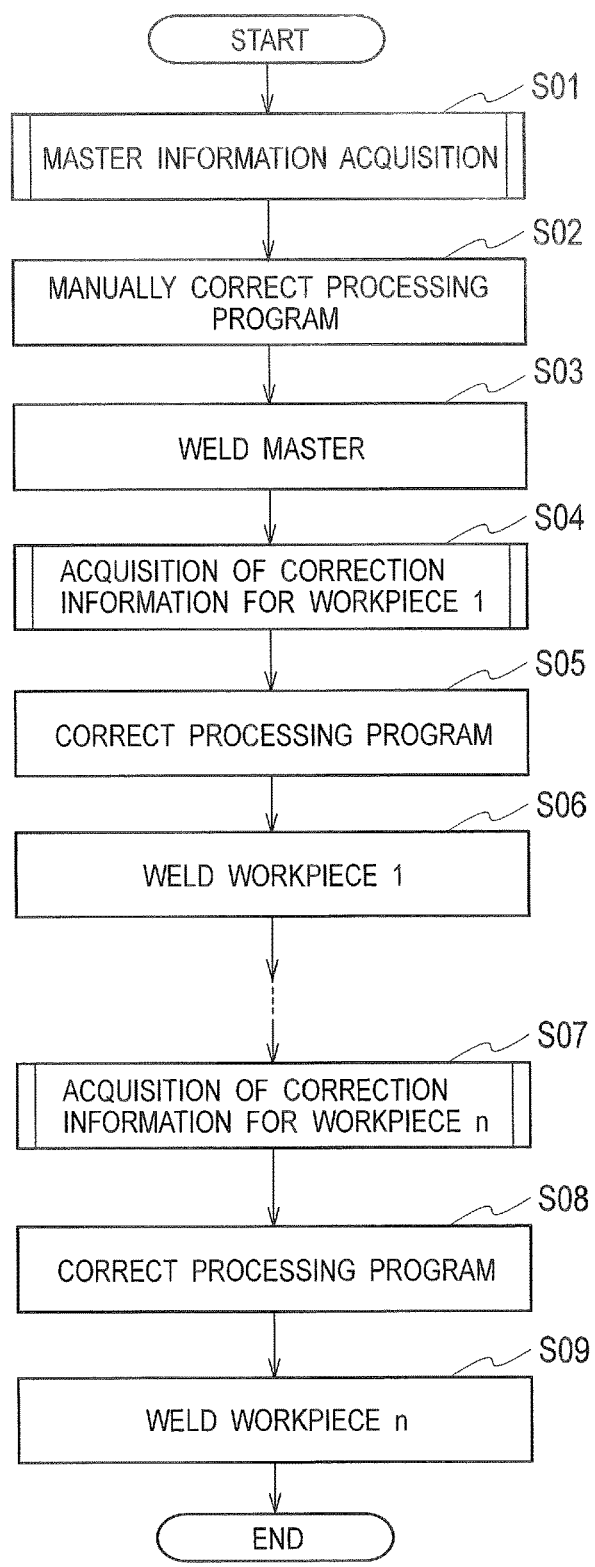
FIG. 4 is a flowchart schematically illustrating an overall process in the event of welding a plurality of products.

FIG. 4 is a flowchart schematically showing an overall process in the event of welding the plurality of products 30. When a process of the welding and the processing is started, then, in step S01, the NC device 12 acquires the master information. In step S02, an operator operates the operation unit 15, and manually corrects the processing program generated in advance as needed.

When such an operation of correcting the processing program is performed, the NC device 12 corrects the processing program in response to the operation, and allows the storage unit 13 to store the corrected processing program therein. In some cases, it is possible to omit the process for the manual correction of the processing program in step S02.

The NC device 12 transfers the corrected processing program (or the processing program generated in advance) to the robot controller 28. In step S03, the welding robot 20 welds the master.

The second product and those after are referred to as workpieces 1 to n. n is an integer of 2 or greater. Here, a description is made on the assumption that the number of workpieces is two or greater; however, the workpiece may be one.

When the welding for the master is completed in step S03, the workpiece 1 is disposed on the surface plate 27. In step S04, the NC device 12 acquires correction information for the workpiece 1 based on the master information. In step S05, the NC device 12 corrects the processing program based on the correction information for the workpiece 1. The NC device 12 transfers the corrected processing program for the workpiece 1 to the robot controller 28.

In step S06, the welding robot 20 welds the workpiece 1 based on the control by the robot controller 28.

For each of the workpieces which are the workpiece 2 and after, the NC device 12 and the welding robot 20 execute similar processes to those of steps S04 to S06.

When the welding for the workpiece (n−1) before the final workpiece n is completed, the workpiece n is disposed on the surface plate 27. In step S07, the NC device 12 acquires correction information for the workpiece n based on the master information. In step S08, the NC device 12 corrects the processing program based on the correction information for the workpiece n. The NC device 12 transfers the corrected processing program for the workpiece n to the robot controller 28.

In step S09, the welding robot 20 welds the workpiece n based on the control by the robot controller 28, and ends the process of the welding.

By using FIG. 5 and FIG. 6A to FIG. 6F, a description is made of a specific procedure of an acquisition process for the master information in step S01 of FIG. 4.

Figure 5:
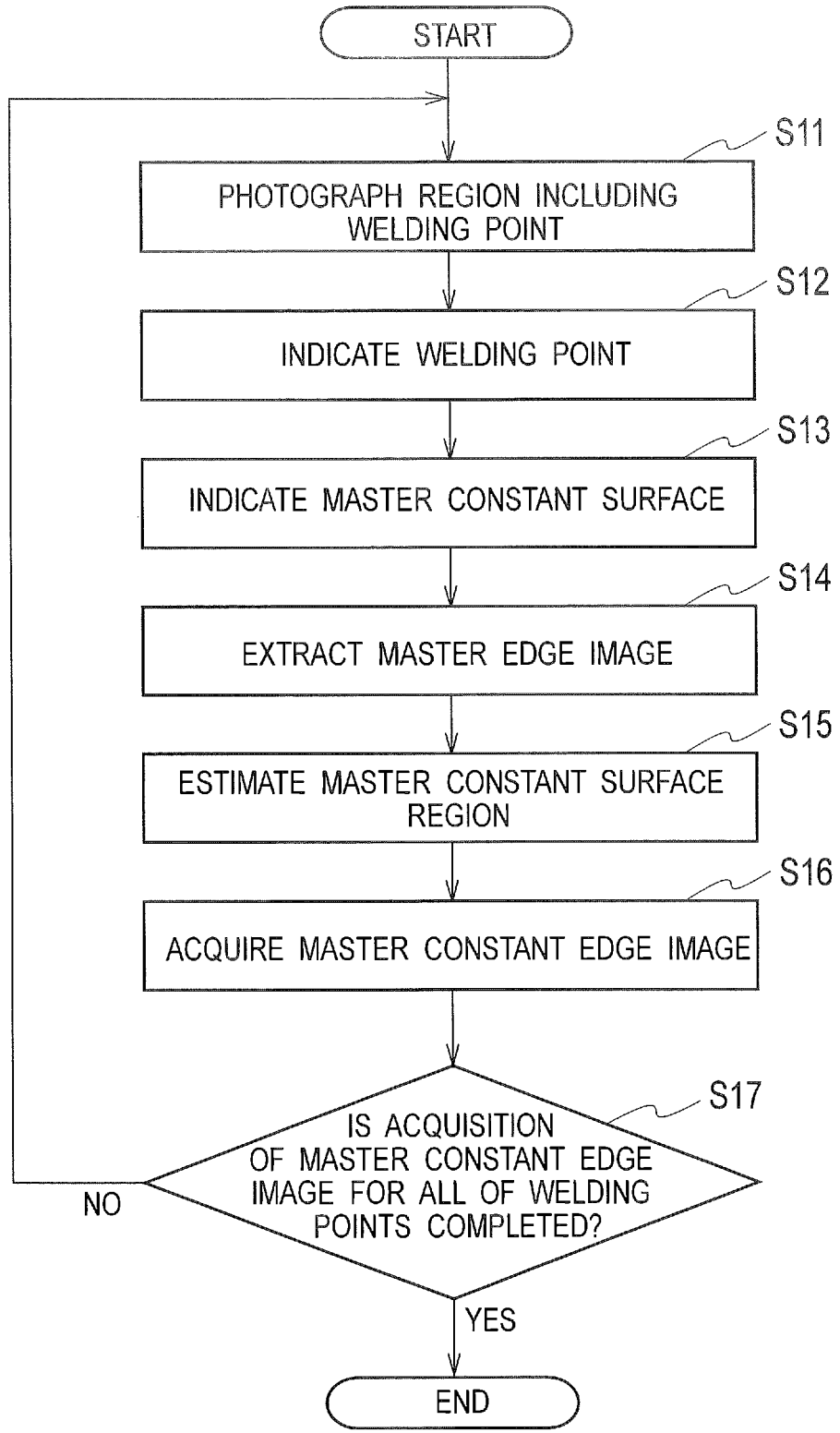
FIG. 5 is a flowchart illustrating a specific procedure of a master information acquisition process in FIG. 4.

In FIG. 5, in step S11, based on the control by the NC device 12, the robot controller 28 moves the welding head 22 to a space above one welding point, which is set by the processing program in a state where the master is positioned onto the surface plate 27.

Then, the robot controller 28 allows the camera 24 to photograph a region including the welding point. An image obtained in such a manner that the camera 24 photographs the region including the welding point of the master is referred to as a master image.

Figure 6A:
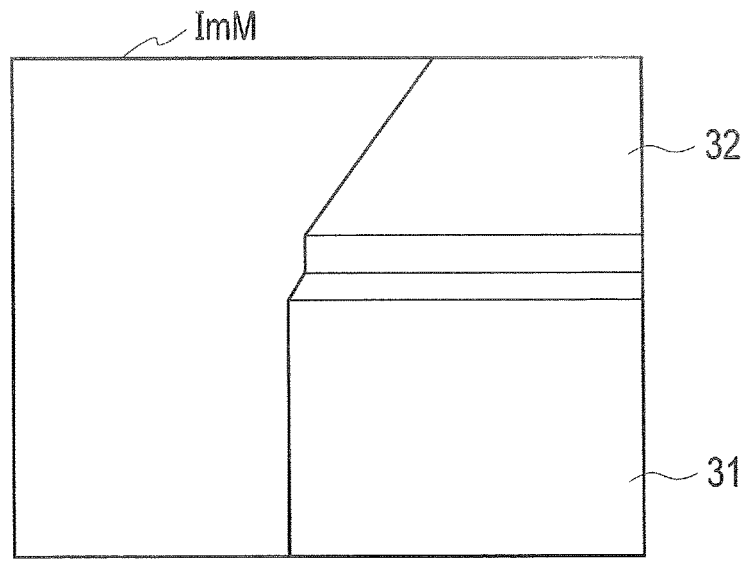
FIG. 6A is a view illustrating a master image obtained by photographing a region including a welding point of a master.

FIG. 6A is a master image ImM, which is obtained in such a manner that the camera 24 photographs a region including the welding point P1 of the product 30 selected as the master. The master image ImM shown in FIG. 6A is displayed on the monitor 14.

In step S12, the operator operates the operation unit 15, and indicates the welding point P1 on the master image ImM, displayed on the monitor 14. The NC device 12 acquires coordinates of the position of the indicated welding point P1 as master welding point coordinates Co1, and allows the storage unit 13 to store the acquired master welding point coordinates Co1 therein.

Figure 6B:
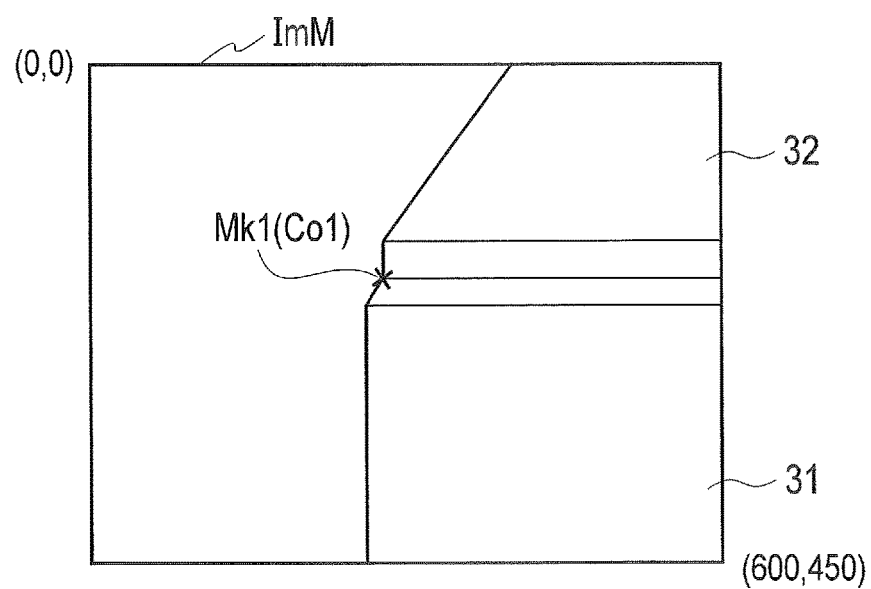
FIG. 6B is a view illustrating a state where a welding point indication mark, which indicates a welding point, is superimposed on a master image.

As shown in FIG. 6B, the NC device 12 superimposes a welding point indication mark Mk1 on the position of the master welding point coordinates Co1 in the master image ImM. Here, as an example, the welding point indication mark Mk1 is shown by a cross.

A resolution of the image displayed on the monitor 14 is, for example, 600 pixels in the horizontal direction, and 450 pixels in the vertical direction. As shown in FIG. 6B, coordinates of a pixel on the upper left end portion can be represented as (0, 0), and coordinates of a pixel on the lower right end portion can be represented as (600, 450). The master welding point coordinates Co1 can be represented by such a pixel position in the horizontal direction and such a pixel position in the vertical direction.

In step S13, the operator operates the operation unit 15, and indicates a constant surface of the master. The definition of a constant surface will be described later. Specifically, the operator indicates an arbitrary position included in the constant surface on the master image ImM. The NC device 12 acquires coordinates of the indicated position in the constant surface as master constant surface coordinates Co2, and allows the storage unit 13 to store the acquired master welding point coordinates Co2 therein.

Figure 6C:
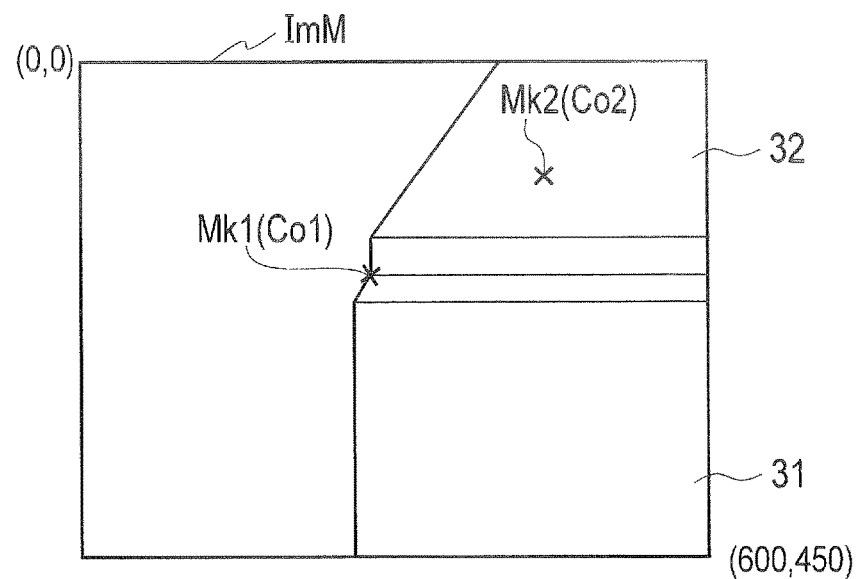
FIG. 6C is a view illustrating a state where constant surface indication marks, which indicate coordinates included in a constant surface, are superimposed on the master image.

As shown in FIG. 6C, the NC device 12 superimposes a constant surface indication mark Mk2 on the position of the master constant surface coordinates Co2 in the master image ImM. As an example, the constant surface indication mark Mk2 is also shown by a cross. The master constant surface coordinates Co2 can also be represented by the pixel position in the horizontal direction, and the pixel position in the vertical direction.

The constant surface is a surface in which a positional deviation does not occur, with respect to the welding point P1 indicated by the welding point indication mark Mk1. As seen from FIG. 3A and FIG. 3B, a position of the surface of the plate 31 deviates with respect to the welding point P1, due to the shape error of the product 30. The surface of the plate 31 is not the constant surface with respect to the welding point P1. The surface of the plate 32 is the constant surface with respect to the welding point P1.

In step S14, the NC device 12 extracts an edge image (master edge image) of the master image ImM shown in FIG. 6A. The NC device 12 extracts the master edge image by using a filter such as a Prewitt filter, a Sobel filter, or a Laplacian filter, which extracts the edge image. The extraction method of the edge image is arbitrary.

Figure 6D:
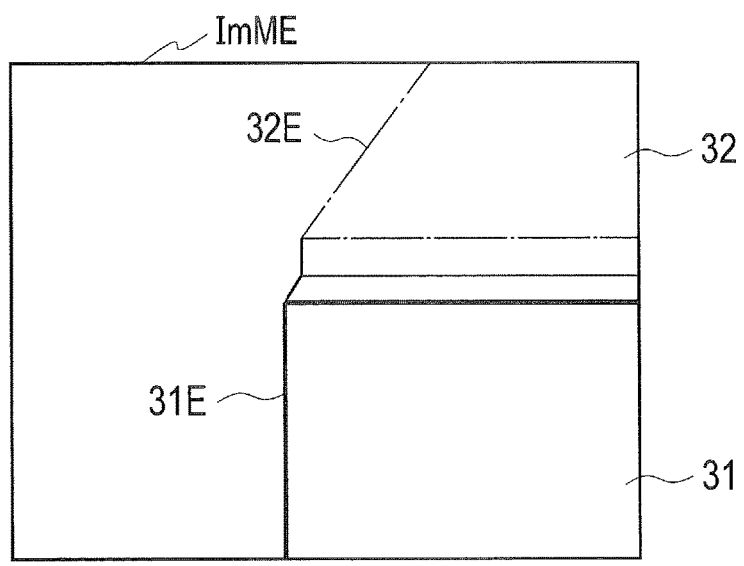
FIG. 6D is a view conceptually illustrating a master edge image extracted from the master image.

FIG. 6D conceptually shows the master edge image ImME extracted from the master image ImM by the NC device 12. FIG. 6D shows the case where the edge image 31E of the plate 31, which is shown by a bold solid line, is clearer than the edge image 32E of the plate 32, which is shown by an alternate long and short dash line. A portion of the edge image, which becomes clearer, differs depending on images.

As in the technology described in Patent Literature 1, in the case of performing pattern-matching between the image of the master and the image of the workpiece by the edge images, then, basically all of the edge images are used. However, in the case where the edge image 31E is clear, as shown in FIG. 6D, since it is likely to be determined that such a clear edge image achieves pattern coincidence, such a case can occur that the pattern-matching is performed by the edge image 31E.

In such a case, the surface of the plate 31 is not the constant surface with respect to the welding point P1; the position of the welding point P1 of the workpiece is erroneously detected.

Accordingly, in step S15, the NC device 12 estimates a constant surface region of the master. The method of estimating the constant surface region is arbitrary. As an example, the NC device 12 can estimate the constant surface region as follows.

The NC device 12 executes a labeling process for assigning the same label (number) to a pixel which has an attribute (for example, a brightness value) similar to that of the master constant surface coordinates Co2 indicated by the constant surface indication mark Mk2 for grouping both of the pixels, and is coupled to the pixel concerned. The NC device 12 estimates the constant surface region of the master by the labeling process.

Figure 6E:
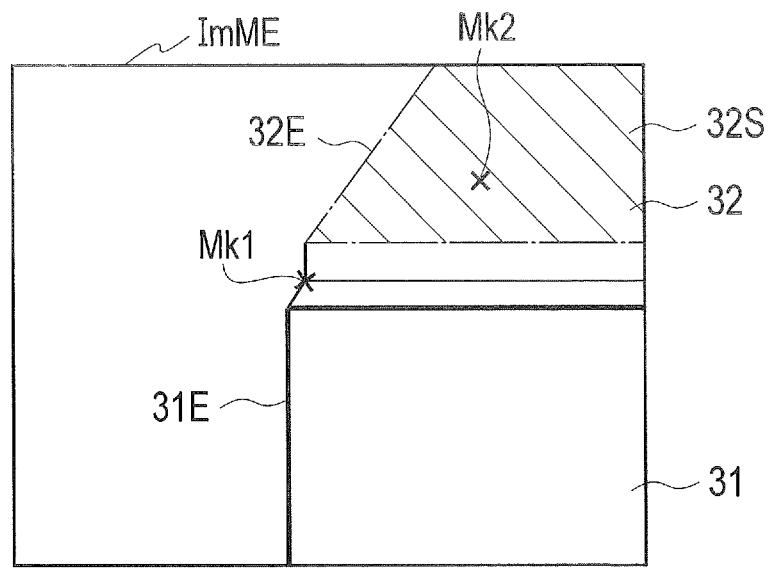
FIG. 6E is a view illustrating a state where a constant surface region is estimated based on the master edge image.

As shown in FIG. 6E, the NC device 12 estimates that a hatched surface 32S of the plate 32 is the constant surface region. The NC device 12 allows the storage unit 13 to store therein data (master constant surface region data) indicating the constant surface region of the master. The master constant surface region data can be represented by an aggregate of coordinates which compose the constant surface region.

In step S16, the NC device 12 acquires an edge image (constant edge image) in the constant surface region of the master. Specifically, in the master edge image ImME, the NC device 12 acquires the edge image in the constant surface region of the master, which is indicated by the master constant surface region data as a master constant edge image.

Figure 6F:
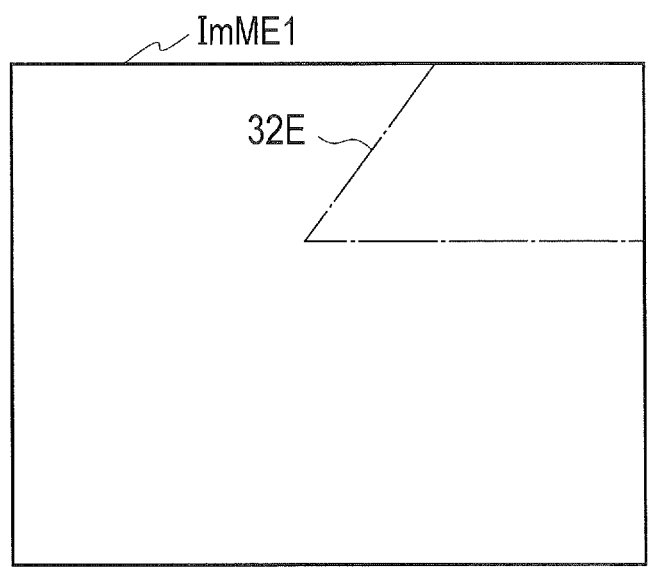
FIG. 6F is a view illustrating a master constant edge image acquired from the master edge image.

FIG. 6F shows such a master constant edge image ImME1 acquired in step S16. Here, the edge image 32E of the surface 32S is acquired as the master constant edge image ImME1. The NC device 12 allows the storage unit 13 to store the master constant edge image ImME1 therein.

In step S17, the NC device 12 determines whether or not the acquisition of the master constant edge image for all of the welding points is completed. If the acquisition is not completed (NO), then the NC device 12 returns the process to step S11. The NC device 12 or the operator executes the processes of steps S11 to S16 for other welding points in a similar manner. If the acquisition is completed (YES), then the NC device 12 ends the acquisition process for the master information.

By using FIG. 7 and FIG. 8A to FIG. 8G, a description is made of a specific procedure of an acquisition process for correction information of the workpiece 1 and the workpiece n in steps S04 and S07 of FIG. 4. The correction information for the workpieces 1 to n is generically referred to as workpiece correction information.

Figure 7:
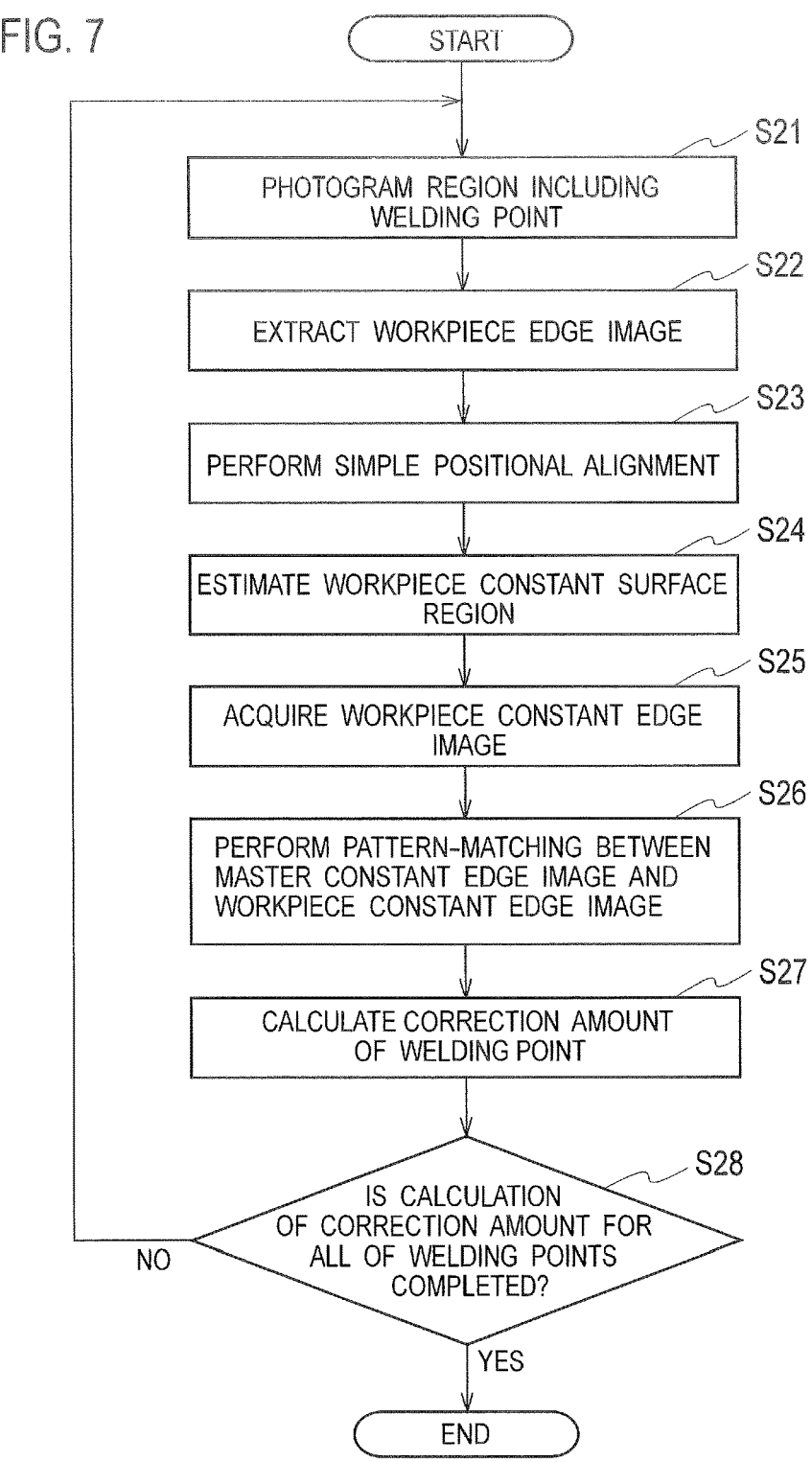
FIG. 7 is a flowchart illustrating a specific procedure of a workpiece correction information acquisition process in FIG. 4.

In step S21 of FIG. 7, based on the control by the NC device 12, the robot controller 28 moves the welding head 22 to the space above one welding point, which is set by the processing program in the state where the workpiece is positioned onto the surface plate 27.

Then, the robot controller 28 allows the camera 24 to photograph the region including the welding point. The image obtained in such a manner that the camera 24 photographs the region, including the welding point of the workpiece, is referred to as a workpiece image.

Figure 8A:
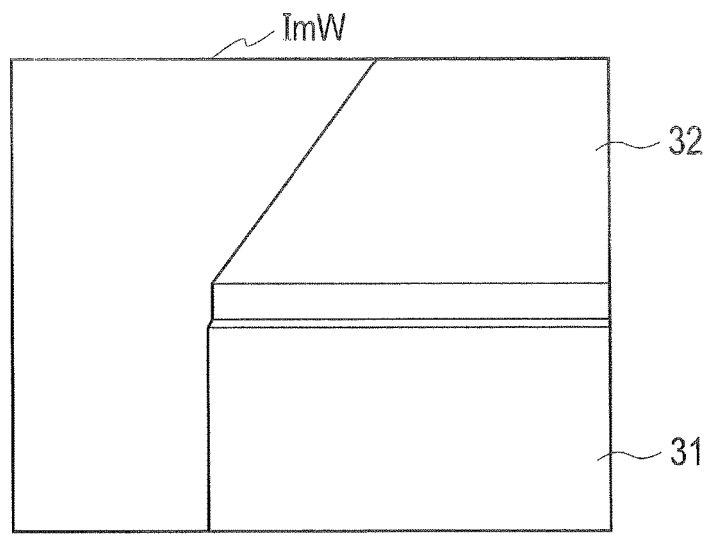
FIG. 8A is a view illustrating a workpiece image obtained by photographing a region including a welding point of the workpiece.

FIG. 8A is a workpiece image ImW, which is obtained in such a manner that the camera 24 photographs the region including the welding point P1 of the product 30 selected as the workpiece. The workpiece image ImW shown in FIG. 8A is displayed on the monitor 14. The workpiece shown in FIG. 8A shows the product 30 in the state where the plate 31 and the plate 32 are assembled to each other in the state where the side end surface 321 gets close to the end portion 311e, similar to FIG. 3A.

Figure 8B:
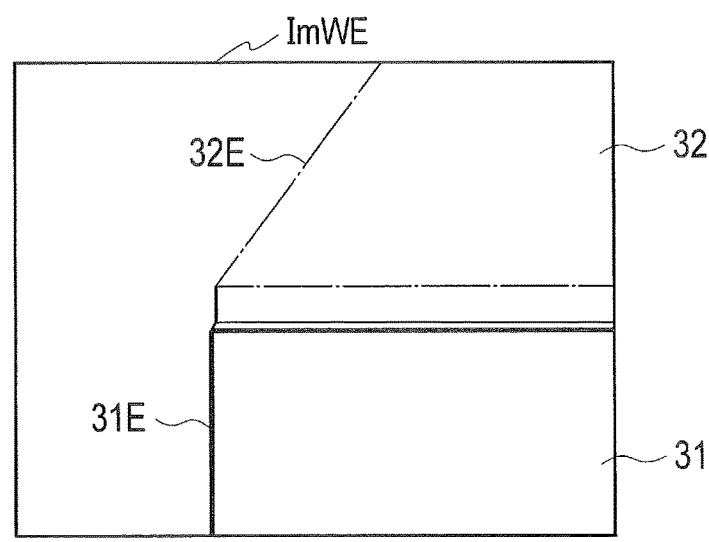
FIG. 8B is a view conceptually illustrating a workpiece edge image extracted from the workpiece image.

As similar to step S14 of FIG. 5, in step S22, the NC device 12 extracts an edge image (workpiece edge image) of the workpiece image ImW shown in FIG. 8A. FIG. 8B conceptually shows the workpiece edge image ImWE extracted from the workpiece image ImW by the NC device 12.

In step S23, the NC device 12 simply aligns the master edge image ImME shown in FIG. 6D and the workpiece edge image ImWE shown in FIG. 8B to each other by using all of the edges by conventional, commonly-used pattern-matching technology.

The master edge image ImME and the workpiece edge image ImWE are aligned to each other, whereby an approximate position (coordinates) on the workpiece image ImW is obtained, which corresponds to the master constant surface coordinates Co2.

The product 30 selected as the master and the product 30 selected as the workpiece have a shape error therebetween, and accordingly, the master edge image ImME and the workpiece edge image ImWE have an error therebetween. Hence, the coordinates on the workpiece image ImW include an error, which correspond to the master constant surface coordinates Co2.

Figure 8C:
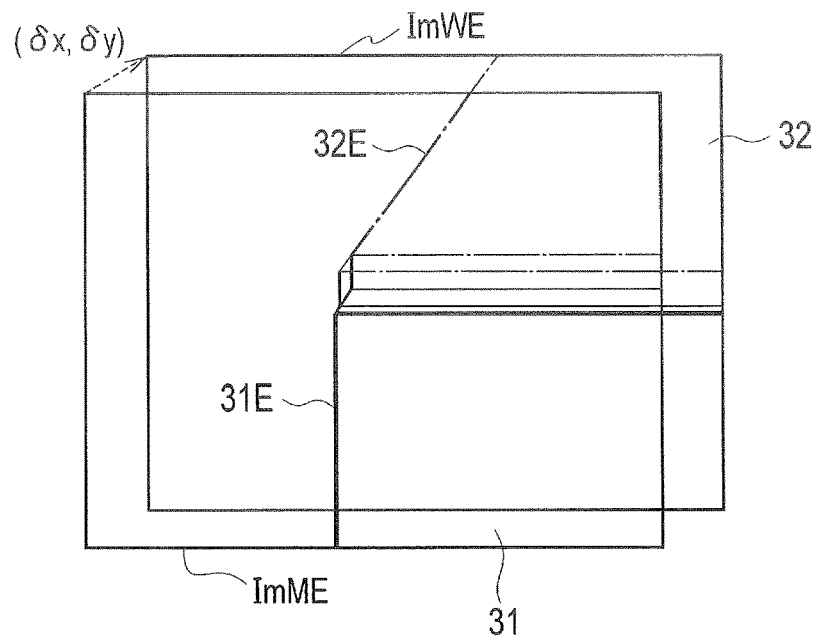
FIG. 8C is a view illustrating positional alignment for obtaining a deviation amount between the master edge image and the workpiece edge image.

The NC device 12 aligns the master edge image ImME and the workpiece edge image ImWE with each other in step S23, and thereby obtains a deviation amount ($\delta x$, $\delta y$) therebetween, as shown in FIG. 8C.

Figure 8D:
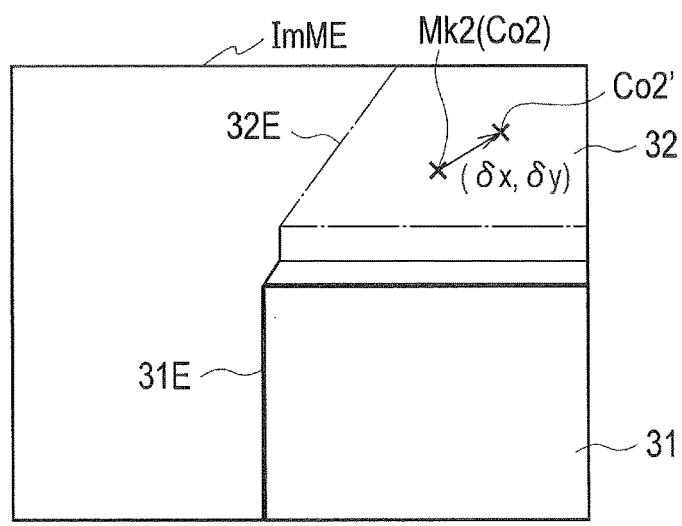
FIG. 8D is a view for explaining a process for obtaining workpiece constant surface coordinates on the workpiece edge image based on master constant surface coordinates shown by the constant surface indication mark superimposed on the master image.

In step S24, the NC device 12 estimates a constant surface region of the workpiece. As shown in FIG. 8D, if the master constant surface coordinates Co2 indicated by the constant surface indication mark Mk2 are shifted by the deviation amount ($\delta x$, $\delta y$), then the workpiece constant surface coordinates Co2' on the workpiece edge image ImWE corresponding to the master constant surface coordinates Co2 can be obtained.

As similar to step S15 of FIG. 5, the NC device 12 executes the labeling process while taking as a reference a pixel on the workpiece constant surface coordinates Co2', and thereby estimates the constant surface region of the workpiece.

Figure 8E:
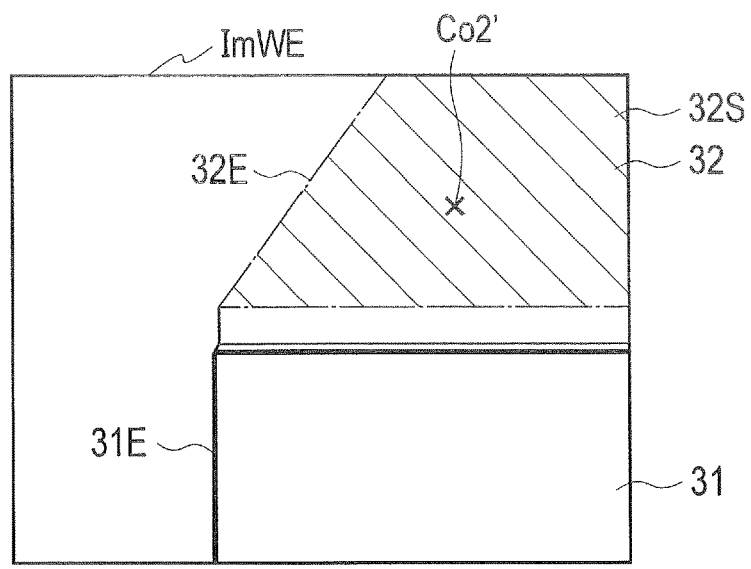
FIG. 8E is a view illustrating a state where the constant surface region is estimated based on the workpiece edge image.

As shown in FIG. 8E, the NC device 12 estimates that a hatched surface 32S of the plate 32 is the constant surface region. The NC device 12 allows the storage unit 13 to store data (workpiece constant surface region data) therein, indicating the constant surface region of the workpiece. The workpiece constant surface region data can also be represented by an aggregate of coordinates, which compose the constant surface region.

In step S25, the NC device 12 acquires an edge image (constant edge image) in the constant surface region of the workpiece. Specifically, in the workpiece edge image ImWE, the NC device 12 acquires the edge image in the constant surface region of the workpiece, which is indicated by the workpiece constant surface region data as a workpiece constant edge image.

Figure 8F:
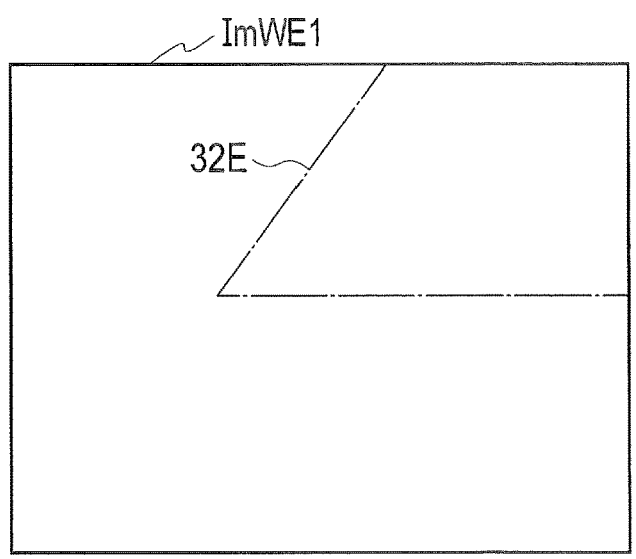
FIG. 8F is a view illustrating a workpiece constant edge image acquired from the workpiece edge image.

FIG. 8F shows such a workpiece constant edge image ImWE1 acquired in step S25. Here, the edge image 32E of the surface 32S is acquired as the workpiece constant edge image ImWE1. The NC device 12 allows the storage unit 13 to store the workpiece constant edge image ImWE1 therein.

In step S26, the NC device 12 performs the pattern-matching between the master constant edge image ImME1, and the workpiece constant edge image ImWE1.

Figure 8G:
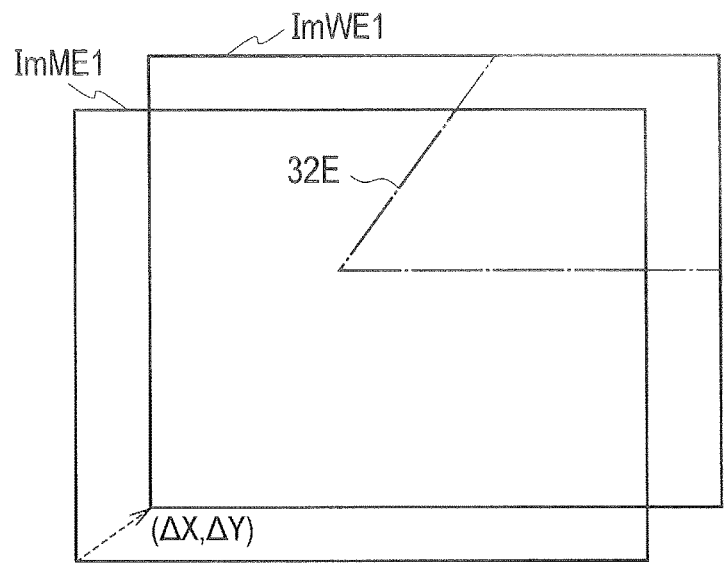
FIG. 8G is a view illustrating pattern-matching for obtaining a deviation amount between the master constant edge image and the workpiece constant edge image.

In step S27, the NC device 12 calculates the correction amount of the welding point. It is assumed that, as shown in FIG. 8G, the master constant edge image ImME1 and the workpiece constant edge image ImWE1 are shifted from each other by a deviation amount ($\Delta X$, $\Delta Y$) as a result of the pattern-matching in step S26. This deviation amount ($\Delta X$, $\Delta Y$) becomes the correction amount of the welding point (here, the welding point P1).

In step S28, the NC device 12 determines whether or not the calculation of the correction amount for all of the welding points is completed. If the calculation is not completed (NO), then the NC device 12 returns the process to step S21. The NC device 12 executes the processes of steps S21 to S27 for the other welding points in a similar manner. If the calculation is completed (YES), the NC device 12 ends the acquisition process for the correction information of the workpiece.

In steps S05 and S08 in FIG. 4, the NC device 12 needs to correct the coordinates of the welding point, which are set by the processing program of the master by the correction amount for each welding point, the correction amount being calculated as described above.

Figure 9:
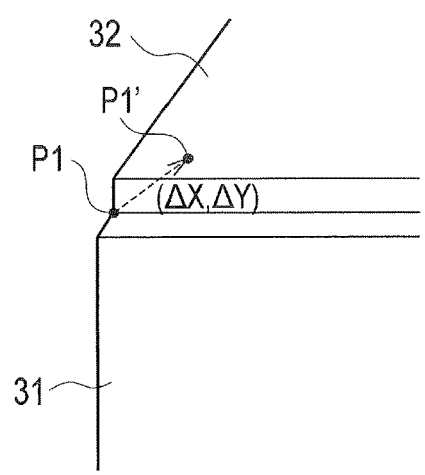
FIG. 9 is a view for explaining a process for correcting a welding point set by a processing program for processing the master.

If the welding point P1 is taken as an example, then as shown in FIG. 9, the NC device 12 makes a correction so that, as a new welding point P1', there can be defined coordinates obtained by shifting the coordinates of the welding point P1, which are set by the processing program of the master by the correction amount ($\Delta X$, $\Delta Y$).

Hence, in the welding for the workpiece in steps S06 and S09 in FIG. 4, even when a shape error is present between the master and each workpiece, the welding machine according to the embodiment can weld each product while accurately correcting the welding position.

Figure 10:
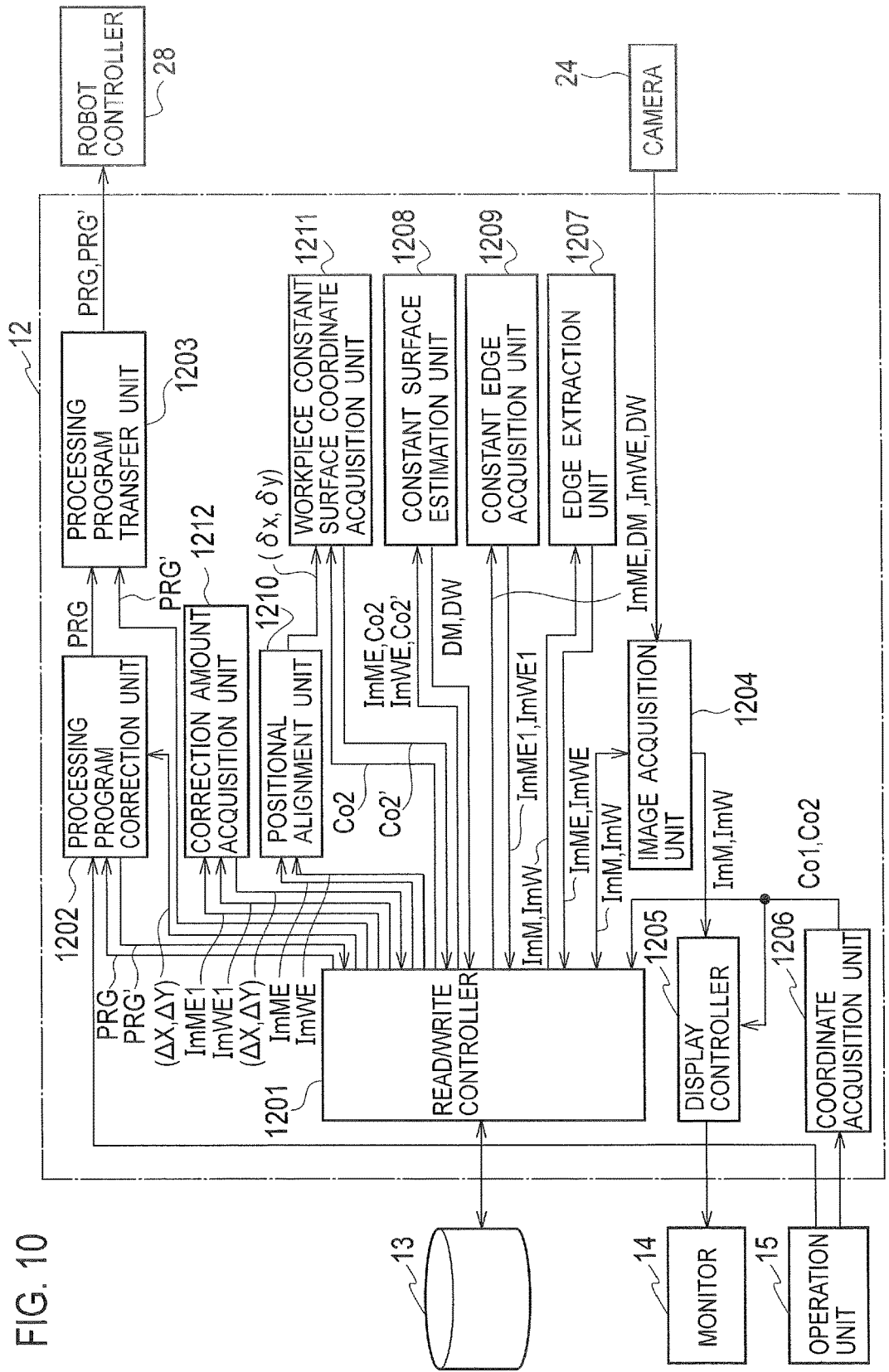
FIG. 10 is a block diagram illustrating a functional internal configuration of an NC device in FIG. 1.
Figure 11:
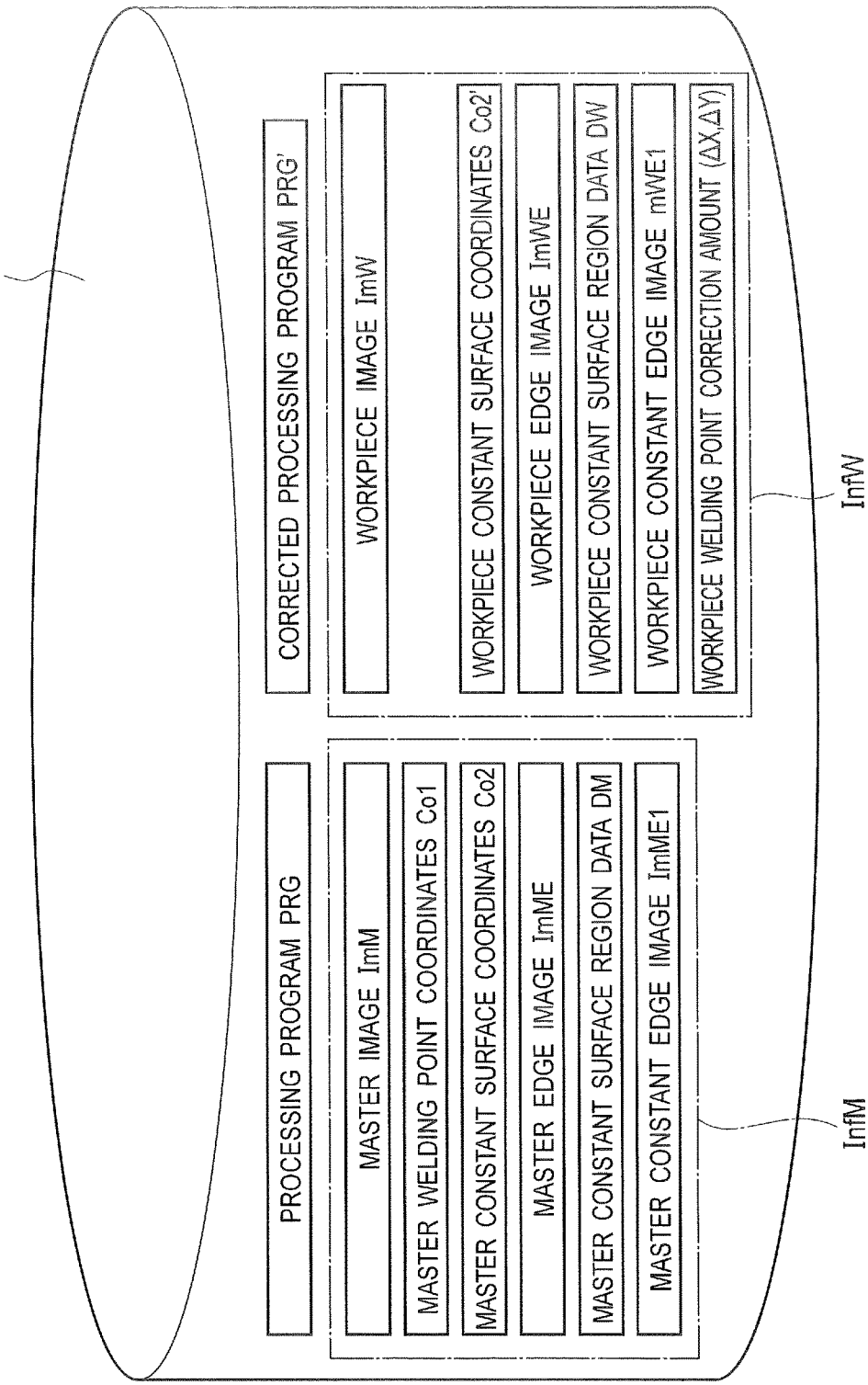
FIG. 11 is a view conceptually illustrating a variety of information stored in a storage unit in FIG. 1.

Next, by using FIG. 10, a description is made of a functional internal configuration of the NC device 12, which is for realizing the acquisition process for the master information shown in FIG. 5, and the acquisition process for the workpiece correction information shown in FIG. 7. FIG. 11 conceptually shows a variety of information stored in the storage unit 13.

As shown in FIG. 11, the processing program PRG, which is generated in advance for processing the product 30, is stored in the storage unit 13. In FIG. 10, the read/write controller 1201 reads out the processing program PRG stored in the storage unit 13.

The processing program PRG is supplied to the processing program transfer unit 1203 through a processing program correction unit 1202. Here, the processing program correction unit 1202 does not correct the processing program PRG, and supplies the processing program PRG as it is to the processing program transfer unit 1203.

The processing program transfer unit 1203 transfers the processing program PRG to the robot controller 28. Accordingly, the robot controller 28 can move the welding head 22 (camera 24) to the space above the welding point set by the processing program PRG. The robot controller 28 allows the camera 24 to photograph the region, including the welding point.

The image acquisition unit 1204 acquires the master image ImM that is a moving picture. The master image ImM is supplied to the read/write controller 1201 and the display controller 1205. As shown in FIG. 11, the read/write controller 1201 writes a still master image ImM into the storage unit 13, which is based on the master image ImM that is a moving picture, and allows the storage unit 13 to store the still master image ImM therein. The display controller 1205 allows the monitor 14 to display the master image ImM thereon.

Both the master image that is a moving picture and the still master image are each referred to as the master image ImM.

The operator operates the operation unit 15, and can thereby indicate the welding point on the master image ImM. A coordinate acquisition unit 1206 acquires the master welding point coordinates Co1, and supplies the acquired master welding point coordinates Co1 to the display controller 1205 and the read/write controller 1201.

The display controller 1205 superimposes the welding point indication mark Mk1 on the master image ImM. As shown in FIG. 11, the read/write controller 1201 writes the master welding point coordinates Co1 into the storage unit 13, and allows the storage unit 13 to store the master welding point coordinates Co1 therein.

Moreover, the operator operates the operation unit 15, and can thereby indicate the coordinates in the constant surface on the master image ImM. The coordinate acquisition unit 1206 acquires the master constant surface coordinates Co2, and supplies the acquired master constant surface coordinates Co2 to the display controller 1205 and the read/write controller 1201.

The display controller 1205 superimposes the constant surface indication mark Mk2 on the master image ImM. As shown in FIG. 11, the read/write controller 1201 writes the master constant surface coordinates Co2 into the storage unit 13, and allows the storage unit 13 to store the master constant surface coordinates Co2 therein.

The master image ImM, which the read/write controller 1201 reads out from the storage unit 13, is supplied to the edge extraction unit 1207. The edge extraction unit 1207 includes a filter for extracting the edge image. The edge extraction unit 1207 extracts the master edge image ImME from the master image ImM. The master edge image ImME is supplied to the read/write controller 1201.

As shown in FIG. 11, the read/write controller 1201 writes the master edge image ImME into the storage unit 13, and allows the storage unit 13 to store the master edge image ImME therein.

The master edge image ImME and the master constant surface coordinates Co2, which the read/write controller 1201 reads out from the storage unit 13, are supplied to a constant surface region estimation unit 1208. The constant surface region estimation unit 1208 executes the labeling process, while taking the master constant surface coordinates Co2 as a reference, and generates master constant surface region data DM. The master constant surface region data DM is supplied to the read/write controller 1201.

As shown in FIG. 11, the read/write controller 1201 writes the master constant surface region data DM into the storage unit 13, and allows the storage unit 13 to store the master constant surface region data DM therein.

The master edge image ImME and the master constant surface region data DM, which the read/write controller 1201 reads out from the storage unit 13, are supplied to a constant edge acquisition unit 1209. The constant edge acquisition unit 1209 acquires the master constant edge image ImME1, based on the master edge image ImME and the master constant surface region data DM. The master constant edge image ImME1 is supplied to the read/write controller 1201.

As shown in FIG. 11, the read/write controller 1201 writes the master constant edge image ImME1 into the storage unit 13, and allows the storage unit 13 to store the master constant edge image ImME1 therein.

In such a manner as described above, for each of the welding points of the master, the NC device 12 can allow the storage unit 13 to store the master information InfM, which is shown in FIG. 11, therein.

In the case where it is necessary to manually correct the processing program PRG in step S02 of FIG. 4, the processing program correction unit 1202 corrects the processing program PRG, in accordance with an operation of the operation unit 15 by the operator. The manually-corrected processing program for welding the master is also referred to as the processing program PRG.

When the welding and the processing for the master are completed in step S03 of FIG. 4, the NC device 12 executes a process for acquiring the workpiece correction information before welding each of the workpieces.

The robot controller 28 allows the camera 24 to photograph the region including the welding point of the workpiece. The image acquisition unit 1204 acquires the workpiece image ImW. The workpiece image ImW is supplied to the read/write controller 1201 and the display controller 1205.

As shown in FIG. 11, the read/write controller 1201 writes the still workpiece image ImW into the storage unit 13, and allows the storage unit 13 to store the still workpiece image ImW therein. The display controller 1205 allows the monitor 14 to display the workpiece image ImW that is a moving picture thereon. Both the workpiece image that is a moving picture and the still workpiece image are each referred to as the workpiece image ImW.

The workpiece image ImW, which the read/write controller 1201 reads out from the storage unit 13, is supplied to the edge extraction unit 1207. The edge extraction unit 1207 extracts the workpiece edge image ImWE from the workpiece image ImW. The workpiece edge image ImWE is supplied to the read/write controller 1201.

As shown in FIG. 11, the read/write controller 1201 writes the workpiece edge image ImWE into the storage unit 13, and allows the storage unit 13 to store the workpiece edge image ImWE therein.

The master edge image ImME and the workpiece edge image ImWE, which the read/write controller 1201 reads out from the storage unit 13, are supplied to the positional alignment unit 1210. The positional alignment unit 1210 aligns the master edge image ImME and the workpiece edge image ImWE with each other, and thereby acquires the deviation amount ($\delta x$, $\delta y$) therebetween.

The deviation amount ($\delta x$, $\delta y$) is supplied to the workpiece constant surface coordinate acquisition unit 1211. The master constant surface coordinates Co2, which the read/write controller 1201 reads out from the storage unit 13, is also supplied to the workpiece constant surface coordinate acquisition unit 1211. The workpiece constant surface coordinate acquisition unit 1211 shifts the master constant surface coordinates Co2 by the deviation amount ($\delta x$, $\delta y$), and acquires the workpiece constant surface coordinates Co2'. The workpiece constant surface coordinates Co2' is supplied to the read/write controller 1201.

As shown in FIG. 11, the read/write controller 1201 writes the workpiece constant surface coordinates Co2' into the storage unit 13, and allows the storage unit 13 to store the workpiece constant surface coordinates Co2' therein.

The workpiece edge image ImWE and the workpiece constant surface coordinates Co2', which the read/write controller 1201 reads out from the storage unit 13, are supplied to the constant surface region estimation unit 1208. The constant surface region estimation unit 1208 executes the labeling process while taking the workpiece constant surface coordinates Co2' as a reference, and generates the workpiece constant surface region data DW. The workpiece constant surface region data DW is supplied to the read/write controller 1201.

As shown in FIG. 11, the read/write controller 1201 writes the workpiece constant surface region data DW into the storage unit 13, and allows the storage unit 13 to store the workpiece constant surface region data DW therein.

The workpiece edge image ImWE and the workpiece constant surface region data DW, which the read/write controller 1201 reads out from the storage unit 13, are supplied to the constant edge acquisition unit 1209. The constant edge acquisition unit 1209 acquires the workpiece constant edge image ImWE1, based on the workpiece edge image ImWE and the workpiece constant surface region data DW. The workpiece constant edge image ImWE1 is supplied to the read/write controller 1201.

As shown in FIG. 11, the read/write controller 1201 writes the workpiece constant edge image ImWE1 into the storage unit 13, and allows the storage unit 13 to store the workpiece constant edge image ImWE1 therein.

The master constant edge image ImME1 and the workpiece constant edge image ImWE1, which the read/write controller 1201 reads out from the storage unit 13, are supplied to the correction amount acquisition unit 1212. The correction amount acquisition unit 1212 performs pattern-matching between the master constant edge image ImME1 and the workpiece constant edge image ImWE1, and acquires a deviation amount ($\Delta X$, $\Delta Y$) therebetween.

Here, the deviation amount ($\Delta X$, $\Delta Y$) is referred to as a workpiece welding point correction amount ($\Delta X$, $\Delta Y$). The workpiece welding point correction amount ($\Delta X$, $\Delta Y$) is supplied to the read/write controller 1201. As shown in FIG. 11, the read/write controller 1201 writes the workpiece welding point correction amount ($\Delta X$, $\Delta Y$) into the storage unit 13, and allows the storage unit 13 to store the workpiece welding point correction amount ($\Delta X$, $\Delta Y$) therein.

In such a manner as described above, for each of the welding points of the workpiece, the NC device 12 can allow the storage unit 13 to store the workpiece correction information InfW, which is shown in FIG. 11, therein. In FIG. 11, only one set of the workpiece correction information InfW is shown; however, the workpiece correction information InfW is stored so as to correspond to each of the welding points.

In the correction process for the processing program in steps S05 and S08 of FIG. 4, the processing program PRG and the workpiece welding point correction amount ($\Delta X$, $\Delta Y$), which the read/write controller 1201 reads out from the storage unit 13, are supplied to the processing program correction unit 1202.

The processing program correction unit 1202 generates a corrected processing program PRG', in which each welding point set by the processing program PRG is corrected by the workpiece welding point correction amount ($\Delta X$, $\Delta Y$). The corrected processing program PRG' is supplied to the read/write controller 1201.

As shown in FIG. 11, the read/write controller 1201 writes the corrected processing program PRG' into the storage unit 13, and allows the storage unit 13 to store the corrected processing program PRG' therein.

In the process for the welding and the processing of the workpiece in steps S06 and S09 of FIG. 4, the corrected processing program PRG', which the read/write controller 1201 reads out from the storage unit 13, is supplied to the processing program transfer unit 1203. The processing program transfer unit 1203 transfers the corrected processing program PRG' to the robot controller 28.

The robot controller 28 controls the welding robot 20, to weld the workpiece based on the corrected processing program PRG'.

The workpiece correction information InfW and the corrected processing program PRG' are generated for each of the workpieces, and are stored in the storage unit 13. Every time when the NC device 12 generates new workpiece correction information InfW and corrected processing program PRG', the storage unit 13 needs to update the workpiece correction information InfW and the corrected processing program PRG'.

The welding machine and the control method therefor according to the embodiment which are described above, are summarized as follows. The product, which is taken as a reference among the plurality of same products as the processing targets is defined as the master, and products other than the master are defined as the workpieces. Although the products are the same, there is a case where the master and each of the workpieces differ from each other due to the product shape error.

The NC device 12 acquires the master image ImM, which is obtained in such a manner that the camera 24 photographs the region including the welding point on the master, which is set by the processing program PRG. The NC device 12 extracts the master edge image ImME from the master image ImM.

When the surface where the positional deviation does not occur with respect to the welding point is defined as the constant surface, the NC device 12 acquires, as the master constant edge image ImME1, the edge image on the constant surface in the master edge image ImME.

The NC device 12 acquires the workpiece image ImW, which is obtained in such a manner that the camera 24 photographs the region including the welding point on the workpiece, which is set by the processing program PRG. The NC device 12 extracts the workpiece edge image ImWE from the workpiece image ImW.

In the workpiece edge image ImWE, the NC device 12 acquires the edge image in the constant surface as the work constant edge image ImWE1.

The NC device 12 performs the pattern-matching between the master constant edge image ImME1 and the workpiece constant edge image ImWE1, and acquires the first deviation amount between the master constant edge image ImME1 and the workpiece constant edge image ImWE1 as the correction amount for the welding point.

The NC device 12 corrects the welding point by the correction amount, which is set by the processing program PRG for welding the master, and generates the corrected processing program PRG' for welding the workpiece. The NC device 12 (robot controller 28) controls the welding robot 20 to weld the workpiece based on the corrected processing program PRG'.

In accordance with the welding machine and the control method therefor according to the embodiment, even when the products have shape errors, the individual products can be welded while accurately correcting the welding positions.

As seen from the above description, the welding machine and the control method therefor according to the embodiment can adopt such a configuration and operation as follows.

The NC device 12 can estimate the master constant surface region of the master based on the master edge image ImME and the first coordinates on the constant surface, and can estimate the workpiece constant surface region of the workpiece based on the workpiece edge image ImWE and the second coordinates on the constant surface.

The NC device 12 can acquire the edge image in the master constant surface region as the master constant edge image ImME1 based on the estimated master constant surface region. The NC device 12 can acquire the edge image in the workpiece constant surface region as the workpiece constant edge image ImWE1 based on the estimated workpiece constant surface region.

The operator operates the operation unit 15, and can thereby indicate position on the constant surface. The NC device 12 can define the position on the constant surface, which is indicated by the operator as the first coordinates. The operator manually indicates the first coordinates, whereby the NC device 12 becomes capable of clearly recognizing the constant surface.

The NC device 12 can align the master edge image ImMe and the workpiece edge image ImWE with each other, and can acquire the second deviation amount between the master edge image ImME and the workpiece edge image ImWE. In this case, the positional alignment may be simple.

The NC device 12 can define the position, which is obtained by shifting the first coordinates by the second deviation amount as the second coordinates. By obtaining the second deviation amount, the NC device 12 can obtain the second coordinates. Hence, the operator does not have to manually indicate the second coordinates.

The present invention is not limited to the embodiment described above, and is changeable in various ways within the scope without departing from the scope of the present invention. The configuration of the laser welding machine shown in FIG. 1 is merely a configuration example that realizes the welding machine and the control method therefor, according to the embodiment. The specific configuration of the welding machine is changeable as appropriate.

The functional internal configuration of the NC device 12, which is shown in FIG. 10, is also merely an example that realizes the operations of the welding machine according to the embodiment, and the control method for the welding machine according to the embodiment. The present invention is not limited to the configurations shown in FIG. 1 and FIG. 10.

The respective internal constituents of the NC device 12, which are shown in FIG. 10, can be composed of software.

A configuration corresponding to the respective internal constituents may be composed of hardware. Choice of the hardware or the software is arbitrary. The hardware may be an integrated circuit.

INDUSTRIAL APPLICABILITY

The present invention can be used for the welding machine that welds a plurality of same products having shape error.

The invention claimed is:

1. A welding machine comprising:
    a camera that photographs a master product to obtain a photographed master image and that photographs a workpiece to obtain a photographed workpiece image;
    an operation unit by which an operator indicates coordinates on the photographed master image;
    a computer that
        performs operations using the photographed master image, comprising:
            receiving first coordinates on the photographed master image, the first coordinates being indicated on a master constant surface by the operation unit, the master constant surface being a region of the master product determined to lack a positional deviation with respect to a master welding point on the master product, the master welding point being a welding point set by a processing program for welding the master product;
            extracting a master edge image of the master product from the photographed master image;
            acquiring a master constant surface region of the master constant surface including the first coordinates; and
            acquiring a master constant edge image based on the master edge image and the master constant surface region, the master constant edge image including a first edge image of the master constant surface region; and
        performs operations using the photographed workpiece image, comprising:
            extracting a workpiece edge image of the workpiece from the photographed workpiece image;
            acquiring a workpiece constant surface region including second coordinates of a position on the photographed workpiece image, the second coordinates being obtained based on the first coordinates;
            acquiring a workpiece constant edge image based on the workpiece edge image and the workpiece constant surface region, the workpiece constant edge image including a second edge image of the workpiece constant surface region;
            performing pattern-matching between the master constant edge image and the workpiece constant edge image so as to match the first edge image and the second edge image to acquire a first deviation amount between the master constant edge image and the workpiece constant edge image as a correction amount for a workpiece welding point, wherein the workpiece welding point is set by the processing program and is a point at which the workpiece is welded; and
            correcting the workpiece welding point by the correction amount to generate a corrected processing program for welding the workpiece; and
    a welding robot that welds the workpiece based on the corrected processing program.

2. The welding machine according to claim 1, wherein the computer further
    performs operations using the photographed master image, comprising:
        estimating the master constant surface region based on the master edge image and the first coordinates to acquire the master constant surface region; and
        acquiring the first edge image in the master constant surface region; and
    performs operations using the photographed workpiece image, comprising:

estimating the workpiece constant surface region based on the workpiece edge image and the second coordinates to acquire the workpiece constant surface region; and acquiring the second edge image in the workpiece constant surface region.

3. The welding machine according to claim 2, wherein the computer further performs operations using the photographed master image and the photographed workpiece image, comprising:

aligning the master edge image and the workpiece edge image with each other to acquire a second deviation amount between the master edge image and the workpiece edge image; and acquiring the second coordinates by shifting the first coordinates by the second deviation amount.

4. A control method for a welding machine, the control method comprising:

defining a product as a master, which is taken as a reference among a plurality of products;

defining another product among the plurality of products other than the master as a workpiece;

acquiring a photographed master image by photographing, with a camera, a region including a master welding point and an edge on the master, the master welding point being a welding point set by a processing program for welding the master;

receiving first coordinates of a position on the photographed master image, the first coordinates being indicated on a master constant surface by an operation unit, the master constant surface being a region of the master determined to lack a positional deviation with respect to the master welding point;

extracting a master edge image of the master from the photographed master image;

acquiring a master constant surface region of the master constant surface including the first coordinates;

acquiring a master constant edge image based on the master edge image and the master constant surface region, the master constant edge image including a first edge image of the master constant surface region;

acquiring a photographed workpiece image by photographing, with the camera, a region including a workpiece welding point and an edge on the workpiece, the workpiece welding point being set by the processing program for welding the workpiece together;

extracting a workpiece edge image of the workpiece from the photographed workpiece image;

acquiring a workpiece constant surface region including second coordinates of a position on the photographed workpiece image, the second coordinates being obtained based on the first coordinates;

acquiring a workpiece constant edge image based on the workpiece edge image and the workpiece constant surface region, the workpiece constant edge image including a second edge image of the workpiece constant surface region;

performing pattern-matching between the master constant edge image and the workpiece constant edge image so as to match the first edge image and the second edge image to acquire a first deviation amount between the master constant edge image and the workpiece constant edge image as a correction amount for the workpiece welding point;

correcting the workpiece welding point by the correction amount to generate a corrected processing program for welding the workpiece; and controlling a welding robot to weld the workpiece based on the corrected processing program.

5. The control method for a welding machine according to claim 4, further comprising:

estimating the master constant surface region based on the master edge image and the first coordinates to acquire the master constant surface region;

estimating the workpiece constant surface region based on the workpiece edge image and the second coordinates to acquire the workpiece constant surface region;

acquiring the first edge image in the master constant surface region; and acquiring the second edge image in the workpiece constant surface region.

6. The control method for a welding machine according to claim 4, wherein the position on the photographed master image of the first coordinates is manually input to the welding machine by an operator.

7. The control method for a welding machine according to claim 4, further comprising:

aligning the master edge image and the workpiece edge image with each other to acquire a second deviation amount between the master edge image and the workpiece edge image; and determining the second coordinates by shifting the first coordinates by the second deviation amount.

* * * * *

UNITED STATES PATENT AND TRADEMARK OFFICE
CERTIFICATE OF CORRECTION

PATENT NO. : 10,191,470 B2
APPLICATION NO. : 15/126780
DATED : January 29, 2019
INVENTOR(S) : H. Inoue It is certified that error appears in the above-identified patent and that said Letters Patent is hereby corrected as shown below:

In the Claims

Column 17, Line 46 (Claim 4, Line 30) please change "workpiece together;" to -- workpiece; --

Signed and Sealed this
Third Day of September, 2019

Andrei Iancu
*Director of the United States Patent and Trademark Office*